United States Patent [19]

Bachman et al.

[11] Patent Number: 4,803,626
[45] Date of Patent: Feb. 7, 1989

[54] UNIVERSAL CONTROLLER FOR MATERIAL DISTRIBUTION DEVICE

[75] Inventors: Wesley J. Bachman, Auburn; Steven G. Stone, Virden, both of Ill.

[73] Assignee: Dickey-john Corporation, Auburn, Ill.

[21] Appl. No.: 97,451

[22] Filed: Sep. 15, 1987

[51] Int. Cl.⁴ .............................................. G06F 15/50
[52] U.S. Cl. ................................. 364/424.07; 118/323; 239/172; 239/390
[58] Field of Search ..................... 364/424; 239/77, 78, 239/172, 390; 47/1.7; 118/323

[56] References Cited

U.S. PATENT DOCUMENTS

| | | | |
|---|---|---|---|
| 3,344,993 | 1/1966 | Wilder et al. | 239/164 |
| 3,877,645 | 4/1975 | Olgschlaeger | 239/155 |
| 4,023,020 | 5/1977 | Lestradet | 364/424 X |
| 4,052,003 | 10/1977 | Steffen | 239/71 |
| 4,392,611 | 7/1983 | Bachman et al. | 239/74 |
| 4,551,801 | 11/1985 | Sokol | 364/424 |

Primary Examiner—Eugene R. Laroche
Assistant Examiner—David Mis
Attorney, Agent, or Firm—Trexler, Bushnell, Giangiorgi & Blackstone, Ltd.

[57] ABSTRACT

A monitoring and control system is provided for a mobile material distribution apparatus wherein the rate of material distribution per unit of area varies as a predetermined function of the ground speed of the mobile apparatus and of the rate of operation of a variable rate delivery structure for delivering material at a controllable rate to material a distribution structure for distributing the material along the path of travel of the mobile apparatus. The monitoring and control system comprises a ground speed sensor for developing a ground speed signal corresponding to the ground speed of the mobile apparatus and a delivery rate sensor for developing a delivery rate signal corresponding to a rate of delivery of material by the variable rate delivery structure. The monitoring and control system includes a monitoring and control circuit responsive to the ground speed signal and to the delivery operation of the variable rate delivery structure to achieve and maintain a desired rate of distribution of material along the path of travel of the mobile distribution apparatus. The monitoring and control circuit further comprises a processor circuit responsive to the ground speed and delivery rate signals for producing the control signals and a memory circuit for storing data and instructions for enabling the processing circuit to respond to delivery rate signals from each of a plurality of different types of delivery rate sensors.

15 Claims, 7 Drawing Sheets

FIG. 5 PSEUDO PERIOD COUNT FREQ. INPUT DETAIL $$F = \frac{Y \, 1000\,000}{X \, 25000 + t_n - t_{n-1}} \, Hz$$

CYCLE RATE $$F_1 = \begin{cases} 40\,Hz, & F_g \geq 40\,Hz \\ F_g, & F_g < 40\,Hz \end{cases}$$

FIG. 6 PULSE WIDTH MODULATION MTR DRIVE DETAIL

UNIVERSAL CONTROLLER FOR MATERIAL DISTRIBUTION DEVICE

BACKGROUND OF THE INVENTION

The present invention is directed generally to the monitoring and control art and more particularly to a novel and improved monitoring and control system for a mobile material distribution apparatus.

Generally speaking, mobile material distribution devices or apparatus include on-the-road and off-the-road spreader and sprayer apparatus. Such apparatus generally require control systems for controlling the rate of distribution of material by means of various control valves or other control members. Examples of such material distribution apparatus are agricultural fertilizer sprayers and/or spreaders, as well as machines used in agriculture for distributing various insecticides, herbicides and other material. Similarly, over-the-road vehicles may be utilized to distribute insecticide or herbicide materials along highways, or to distribute dust control or binder materials for some road surfaces, or for various ice control products.

It will be appreciated that each of the forgoing applications requires a control arrangement to control the flow or supply of material fed to a distribution device for carrying out the actual spreading or spraying of material on the surface to be treated. Examples of such a distribution device are a spray bar having one or more nozzles for spraying liquid materials and a rotary broadcast-type spreader for distributing granular materials. Generally, the control arrangement may employ a control valve in line with the supply of liquid to be sprayed by the nozzles, or in return line if desired, to control the pressure and/or flow to the nozzles. Alternatively, the control valve may be used as pilot-type of valve in a hydraulic or other control system for regulating the speed of one or more pumps or conveyor drive motors in the case of granular materials. Other systems may use other electrical or electromechanical control members for controlling the rate of delivery of a liquid or a granular material to the appropriate spray bar or broadcast spreader for distribution.

In addition to providing for such control functions, it is also desirable to monitor and display the distribution rate of material from time to time to assure proper operation of the apparatus to an operator. In addition, it is often desirable in such systems to additionally monitor other factors such as the remaining quantity of liquid or granular material remaining in a hopper or supply tank mounted on the vehicle, or the pressure and/or flow rate at one or more supply lines in the case of liquid sprayer apparatus. It is also desirable to provide for periodic selectable automatic flushing or cleansing of the system in a liquid distributor system.

The prior art has proposed a variety of monitoring and/or control systems for such material distribution apparatus. Examples of such systems may be found in Wilder et al. U.S. Pat. No. 3,344,933, Oligschlaeger U.S. Pat. No. 3,877,645, Steffen U.S. Pat. No. 4,052,003 and Bachman et al. U.S. Pat. No. 4,392,611.

We now propose to provide a "universal" or "programmable" type of monitoring system which is capable of being provided either as original equipment or retro-fitted to any of a variety of different mobile material distribution apparatus. However, such a universally usable monitoring and control system would require a great deal of flexibility. That is, the system must have the ability to accommodate a variety of different types of ground speed sensors, flow meters, pressure meters and other input or monitoring devices, in order to provide both accurate and useful displays of apparatus operation as well as to provide accurate and reliable control of material distribution rate.

For example, many types of ground sensor apparatus are known, from relatively simply mechanical or electromechanical tachometers to relatively sophisticated radar-based. "Doppler" speed detection systems. Similarly, the control of granular-type spreaders often requires monitoring and control of a drive component for a conveyor or like material delivery structure. Such control would require a similar rotational speed detector or "tachometer", which may be of various mechanical or electromechanical or even electromagnetic types, and moreover may be placed at any of a variety of locations in the drive system of a given apparatus. That is, such a "pick-up" device might be placed directly adjacent a rotating member of the conveyor itself, elsewhere back in the drive system, such as adjacent some conveniently-accessible gear or shaft or other rotating drive or transmission member. Similarly, the flow of material to nozzles in a liquid sprayer system amy be detected as a function of pressure in the spray bar, pressure in a return line, or alternatively, by metering the flow in a delivery conduit or line to the spray bar. Moreover, the choice of the type, number and spacing of nozzles for liquid sprayers must also be taken into account in order to properly monitor, display and control the distribution rate of material.

As a further matter, such a universal monitoring and control system must further be adaptable to monitoring and display in terms of either English or metric units as desired by a particular operator. Such a system must further be capable of calibration over a relatively wide range of application rates for use in distributing various materials at differing rates for given purposes. Moreover, many materials require that the density or weight per unit volume of material also be taken into account in determining and controlling the distribution rate. Such a system must also be adaptable to a plurality of types and numbers of nozzles, and/or broadcast spreader devices, as well as to varying effective widths of coverage achieved thereby, in order to properly monitor and control the distribution rate of material on a per unit area basis. Additionally, such systems must be capable of setting in certain predetermined maximum and minimum desired operating limits, as well as various alarm limits, so that the operator may have an observable alarm or warning when operation fails to fall within such limits. Such warning may be accompanied by automatic shut-down of one or more components of the apparatus as well, if desired.

In accordance with the invention, a monitoring and control system is provided for a mobile material distribution apparatus wherein the rate of material distribution per unit of area varies as a predetermined function of the ground speed of the mobile apparatus and of the rate of operation of variable rate delivery means for delivering material at a controllable rate to material distribution means for distributing the material along the path of travel of the mobile apparatus; said monitoring and control system comprising: ground speed sensor means for developing a ground speed signal corresponding to the ground speed of the mobile apparatus and delivery rate sensor means. for developing a delivery rate signal corresponding to a rate of delivery of material by said variable rate delivery means; said monitoring and control system including monitoring and control circuit means responsive to said ground speed signal and to said delivery rate signal for developing a control signal for controlling the operation of said variable rate delivery means to achieve and maintain a desired rate of distribution of material along the path of travel of the mobile distribution apparatus, said monitoring and control circuit means further comprising processing means responsive to said ground speed and delivery rate signals for producing said control signals and memory means for storing data and instructions for enabling said processing means to respond to delivery rate signals from each of a plurality of different types of delivery rate sensor means.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

Figures 1, 1A, 2:
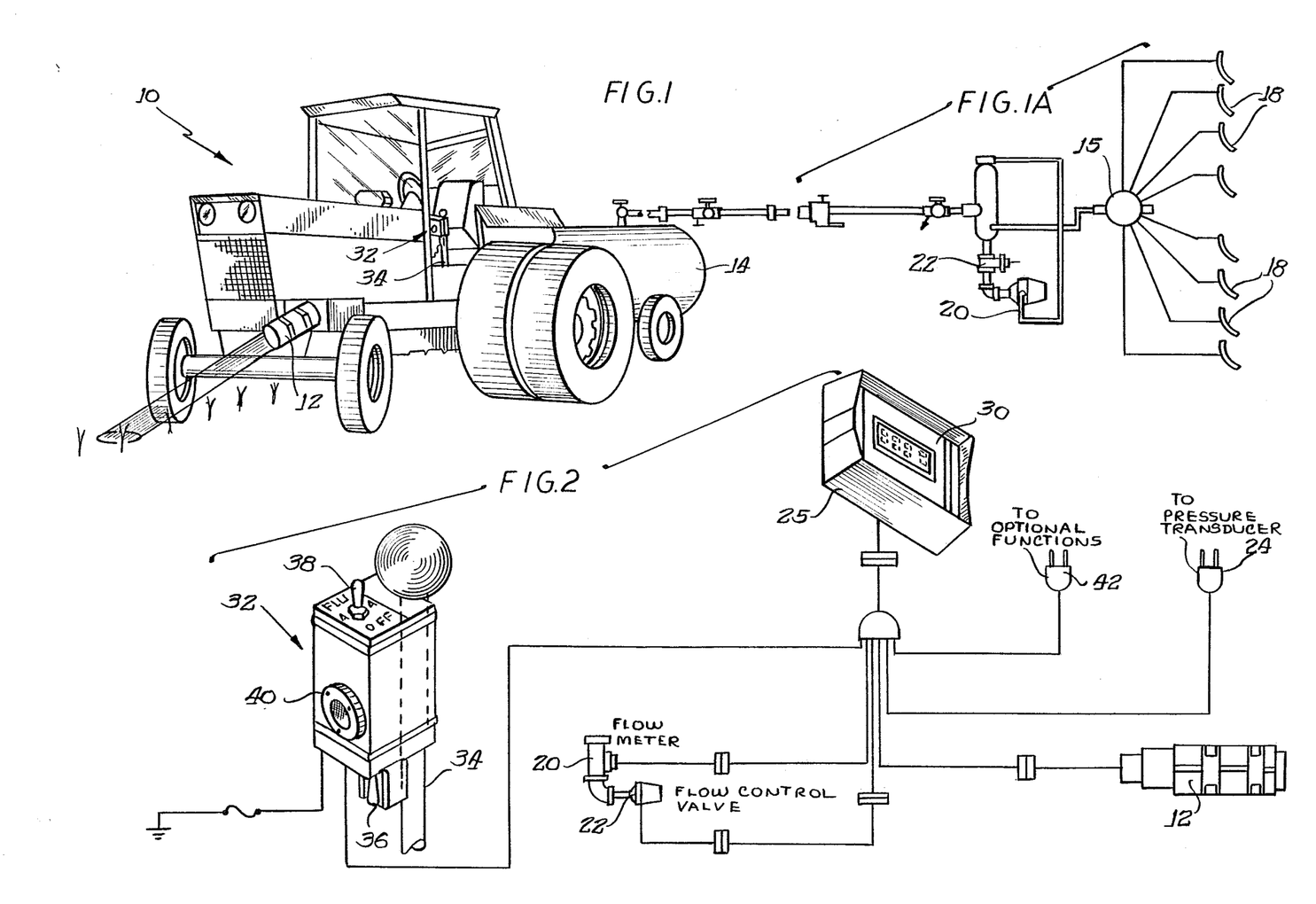
FIG. 1 is a perspective view, partially diagrammatic in form, illustrating a tractor-drawn liquid fertilizer distribution or sprayer apparatus in connection with which the system of the invention may advantageously be utilized.
FIG. 1A illustrates a sprayer apparatus.
FIG. 2 is a diagrammatic representation of the operative connections of a monitor and control console in accordance with the invention with various portions of the apparatus of FIG. 1.

Referring now to the drawings and initially to FIGS. 1 and 2, the invention will be illustrated and described herein in connection with the monitoring and control of the operation of a liquid distribution apparatus of the type generally shown in FIG. 1. It will be understood, however, that the system of the invention is, in accordance with the important features of the invention, useful with any of a number of different material distribution apparatus, used in a variety of applications as discussed hereinabove as such, the invention is by no means limited to the liquid distribution system illustrated in FIGS. 1 and 2.

Initially turning to FIG. 1, a material distribution apparatus in connection with which the invention may be utilized may include a vehicle such as a tractor 10. The tractor 10 is preferably provided with a ground speed sensor, which may take the form of a radar-type of radar velocity sensor 12. The radar velocity sensor 12 may take a variety of forms without departing from the invention. One particularly advantageous type of radar velocity sensor is shown and described in U.S. Pat. No. 4,633,252.

In the embodiment illustrated in FIG. 1, the tractor 10 pulls a mobile material distribution apparatus, here illustrated as including a wheeled tank 14 for carrying a supply of liquid to be distributed. It should be understood that the system may include a hopper or other suitable structure for carrying a supply of granular material without departing from the invention. The liquid material may include liquid fertilizers, herbicides or insecticides to be sprayed and agricultural operations. Similarly, granular materials may include various weed control materials or fertilizers in granular form, or may include ice control materials for distribution on roads or highways, or the like by an over-road type of vehicle (not shown) without departing from the invention.

Figures 1B, 1C, 4:
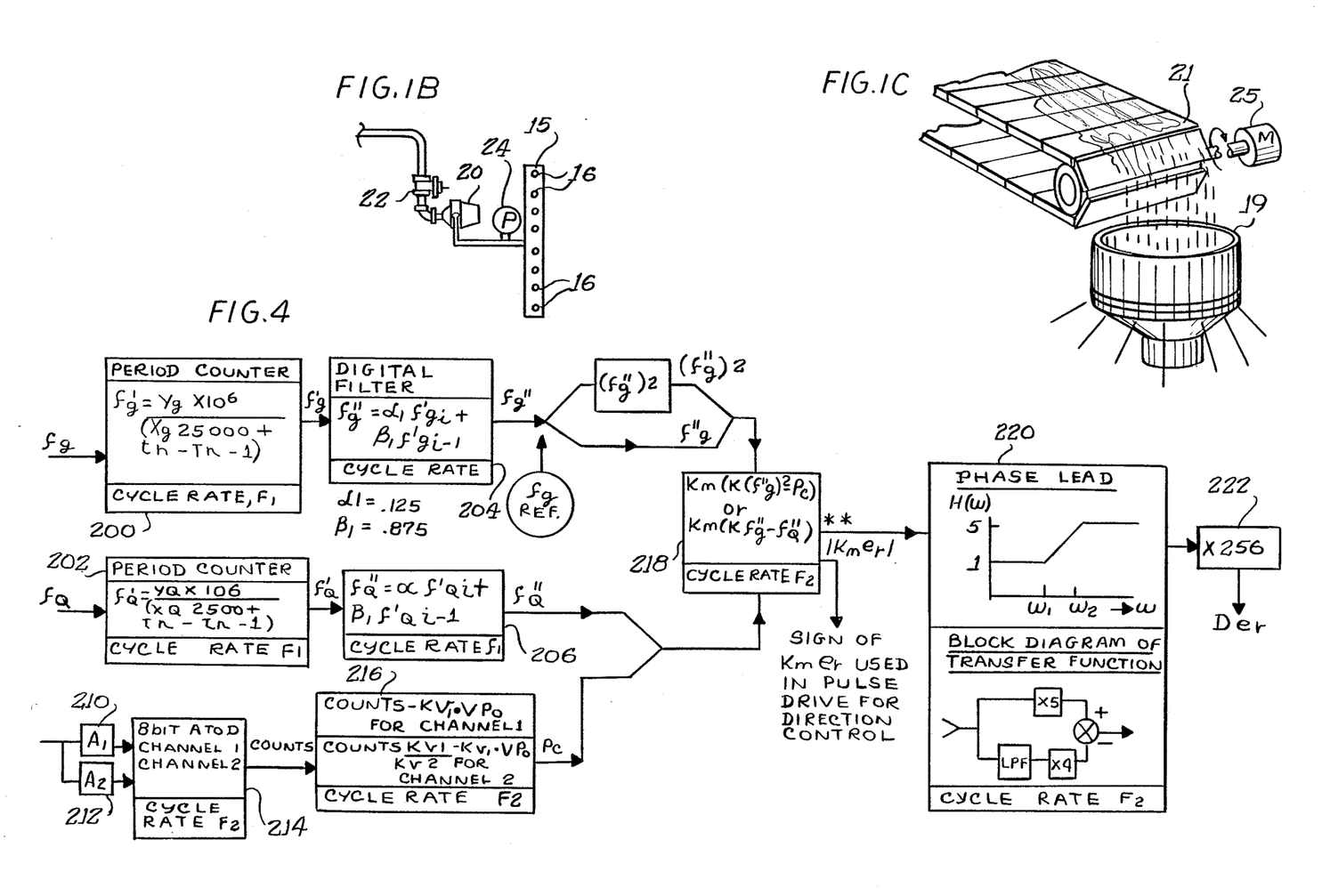
FIG. 1B illustrates an anhydrous ammonia delivery apparatus.
FIG. 1C illustrates a grannular material spreader apparatus.
FIGS. 4, 5, and 6 are functional block diagrams in the nature of flow charts, further illustrating various aspects of operation of the control and monitoring system of the invention.

In the embodiments illustrated in FIGS. 1A and 1B two types of liquid distribution systems are schematically illustrated. In FIG. 1A a sprayer system employing a spray bar 15 with a plurality of nozzles 16 is illustrated. In FIG. 1B, an anhydrous ammonia (NH3) distribution system employing a manifold for feeding anhydrous ammonia to be incorporated into the soil at a plurality of knives 18 is illustrated. However, in a granular-type of distribution system, as somewhat schematically shown in FIG. 1C, some other material distribution means, such as one or more broadcast spreaders 19 may be employed. In such a system, some suitable means such as a conveyor belt 21 or other delivery apparatus may be employed to deliver granular material to the broadcast spreaders 19.

In any event, each of the foregoing material distribution apparatus employs some material distribution means for distributing material along the path of travel of the apparatus, including either broadcast spreaders (not shown) as just mentioned or nozzles 16 or knives 18 as just described. Moreover, each type of apparatus further includes some type of delivery rate sensor means for developing a delivery rate signal corresponding to the rate of delivery of material to the distribution means (e.g. knives 16, nozzles 18 or spreader 19). Preferably such delivery means are controllably variably for varying the rate at which the material is delivered to the distribution means thereby.

In the system illustrated in FIGS. 1A and 1B a flow control valve 20 is utilized as the variable rate delivery means control element. This flow control valve 20 is preferably of the motor-driven type, wherein an electrical motor is arranged to rotate the valve to any desired position between fully open and fully closed so as to control rate of liquid delivered therethrough to the material distribution means such as nozzle 16 or knives 18. In a granular type of system as mentioned above, such a flow control valve might form a control valve for a hydraulic motor 25 or the like for driving a conveyor 21 or other material delivery means for delivering granular material to one or more broadcast spreaders 19.

An additional delivery rate sensor means is also provided in each of the systems of FIGS. 1A and 1B for developing a delivery rate signal corresponding in some predetermined fashion to the rate of delivery of material by the variable rate delivery means to the material distribution means. Such variable delivery rate sensor means may comprise a flow rate sensor 22 interposed in a fluid line intermediate the fluid supply and control valve 20. It should be recognized that in the solid material type of delivery system a similar flow meter might be utilized to measure the flow through a similar control valve to a hydraulic motor for controlling conveyor speed. Alternatively, the delivery rate sensor means may comprise a pressure meter for sensing the liquid pressure at the manifold 15, that is, the pressure across the nozzles 16 or knives 18.

Referring briefly to FIG. 2, like reference numerals indicate the flow meter 20, flow valve 22 and ground speed transducer or radar apparatus 12. It will be noted that each of these elements is electrically coupled for delivering its corresponding sensor signal or output signal to a control and monitoring means schematically illustrated as as console 25 having a display and control panel 30.

Also shown in the embodiment illustrated in FIG. 1 and FIG. 2 is a preferred form of operator actuatable switching apparatus designated generally by reference numeral 32. This switching apparatus 32 is preferably configured for easy attachment to a gear shift or other control lever 34 of the tractor or other vehicle 10. The switching apparatus 32 includes a power on/off switch 36, and an automatic/flush/off (AUTO/FLUSH/OFF) switch 38 and optionally, an audible alert or alarm device 40 such as a "sonalert".

In operation, the power switch is utilized to apply operating power to the control system or control console 25 as will be more fully described later. The AUTO/FLUSH/OFF switch 38 provides a control valve shut off command for shutting down valve 22 in the OFF position. In the AUTO position, this switch provides the console 25 with a command for initiating automatic control system operation for controlling the distribution of material in accordance with the invention, as will be more fully described hereinbelow. In the FLUSH position, switch 38 provides the control console 25 with a command that causes the valve 22 to be opened to a predetermined "flush" position, for example, for delivering a flow of water or other cleansing fluid for cleaning the system after use, or for discharging remaining unused liquid from the system.

The liquid sprayer system of FIG. 1A preferably utilizes the pressure signal in connection with the ground speed signal developed by radar or other ground speed sensor 12 to control the setting of the valve 20 to achieve the desired material distribution rate. Accordingly, the addition of a flow rate sensor 22 provides a separate monitoring function, that is, monitoring for possible malfunctions of the system such as plugged nozzles, worn-out nozzles or leaks in the system. If such malfunctions occur in the system of FIG. 1A, it will be appreciated that the measured flow will vary from its expected value, given the pressure in the system, the setting of valve 20 and the number of nozzles 16. In a properly functioning system, therefore the ground speed and the flow rate will bear some predetermined, constant ratio to one another, given these other factors (i.e. pressure, number of nozzles and selected control valve setting).

Accordingly, the flow meter performs no control function in the system by merely acts as an additional "nozzle monitor" so as to warn the operator of an improperly functioning or inoperative nozzle. Nozzles may malfunction either due to excessive wear or breakage which would cause greater flow than their nominal flow characteristics or by becoming plugged or clogged with dirt, debris or other material. A sudden change in flow rate would occur due to either sort of malfunction and such a change would be detected by flow meter 22. In contrast, in the anhydrous ammonia distribution system of FIG. 1B, a flow meter 22 is utilized as the rate delivery sensor means.

In the illustrated embodiment, the monitoring and control system utilizes the ground speed signal provided by ground speed sensor 12 as a reference signal and the distribution rate signal provided by selected one of flow rate meter or sensor 22, or pressure sensor 24, as the feedback signal. This arrangement provides control of the flow control valve 20 and hence of the distribution rate of material per unit area by the mobile material distribution apparatus.

As will be more fully described hereinbelow, the monitoring and control system includes novel monitoring and control circuit means, illustrated in functional block form in FIG. 3 and in circuit schematic form in FIG. 4. In accordance with the invention, this monitoring and control circuit means is responsive to the ground speed signal and the delivery rate signal for developing a control signal for controlling the rate of the variable rate delivery means, such as the setting of control valve 20, to achieve and maintain a desired rate of distribution of material along the path of travel of the mobile distribution apparatus.

In the exemplary embodiment illustrated herein, the montoring and control circuit means further include processing means responsive to the ground speed and delivery rate signals for producing not only the control signals, but also for producing further, display signals corresponding to associated functions and conditions of the mobile apparatus. In this regard, and referring briefly to FIG. 2, it will be seen that a further input 42 to the monitor and control console 25 is provided for "optional functions". This further input may include a plurality of inputs, if desired, to monitor conditions at a plurality of points in the machine or apparatus to provide suitable display signals for advising the operator of the status of the associated functions and conditions during operation In accordance with the invention, further memory means are provided for storing data and instructions to be utilized for enabling the processing means to respond to the delivery rate signals produced by any of a plurality of different types of delivery rate sensors. Such data and instructions may include data and instructions appropriate either to a pressure type of sensor such as sensor 24 or a flow rate type of sensor such as sensor 22. Moreover, additional data and instructions may be included in the memory means for enabling specific response to any of a plurality of specific ones of flow sensors and/or pressure sensors, in accordance with the actual form of the pressure and/or flow rate signals produced by each. The processing means preferably further includes means for identifying a particular type of delivery rate sensor means coupled with the control and monitoring circuit, and the processing means is responsive to the sensor identifying means for selecting from the memory means data and instructions for enabling response to the delivery rate sensor means identified.

In accordance with the preferred form of the invention, the above-mentioned memory means includes first, mask-programmable, non-alterable memory means for containing certain non-changeable or permanent constant data, such as unit conversion constants for converting from metric to English values, from square feet to acres, and the like. As will be more fully explained later with reference to FIG. 4, memory capacity for these memory functions is found both in a microprocessor component in the form of onboard memory, as well as in the form of onboard non-volatile, electrically programmable memory components.

A further, non-volative memory means is accessible only to authorized factory or service programming personnel for containing changeable conversion constants including the data and instructions, as mentioned above, for enabling response of the system to any of a plurality of different delivery rate sensors including various pressure sensors and/or flow rate sensors.

Finally, the memory means includes a user-accessible non-volatile memory portion or means for receiving and storing data entered by the user, or on behalf of the user, for the particular characteristics of the actual apparatus with which the system is to be utilized, such as data to "identify" the actual delivery rate sensor selected for use with the apparatus. Additionally, the non-volatile memory is adapted to receive and store other user-selected data or inputs. Such data may correspond to selection by the user of either English or metric units for display. Data for calibration of the system for operation with a ground speed sensor such as the radar unit 12, or other ground speed sensor which is provided on the tractor or other mobile distribution apparatus may also be entered. Such calibration data in effect serves to "identify" the sensor to the processor. The characteristics of the distribution means, such as the orifice size or flow rates of the nozzles or knives, the rotational speed of broadcast spreaders, or the like may also be so entered by the operator. Alternatively, factory or service programming may include additional conversion constants for responding to any of a plurality of different models of sensors such as ground speed sensors, from which the user may select, avoiding the necessity of entering particular data, when one of these "pre-programmed" sensors is selected for use.

Figure 3:
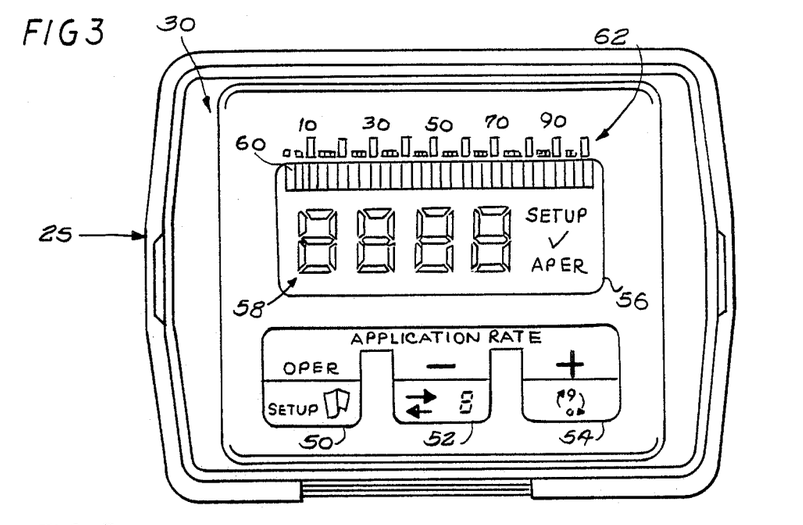
FIG. 3 is an enlarged front elevation of the face of a control and monitoring console in accordance with a preferred form of the invention.

Referring next to FIG. 3, operation of the monitoring and control system of the illustrated embodiment will now be described in further detail with reference to the display and control panel or face 30 of the console 25.

Referring now more particularly to FIG. 3, the control console panel 30 includes three "touch" switches 50, 52 and 54 and a display window 56. The display window 56 includes a four-digit display 58 which preferably comprises four seven-segment liquid crystal display (LCD) elements with decimal points. The display panel also includes a multi-segment bar graph display, also preferably composed of multiple LCD segments 60. In addition, a plurality of printed or otherwise formed permanent markings 62 may be included in the face plate or panel 30 immediately above the bar graph display 60. Additional, preferably LCD, symbols "SETUP", a check mark, and "APER" and are also provided to the right-hand side of the four-digit display.

Initially, touching the operate/set up switch 50 permits selection of either the SETUP mode for programming or setting up the monitor for operation with a particular apparatus, or the selection of operating mode of the console for actual operation following the setup procedure. In the operate mode, touching switch 50 while the OFF/AUTO/FLUSH switch 38 is in the FLUSH position provides a command for the flush operation, that is to flush out the system, as described above. In the operate mode, holding the switch 50 depressed for approximately three seconds will cause the control system to enter into the SETUP mode. In the SETUP mode, touching switch 50 briefly causes the system and display to move to the next setup operation in a sequence which will be explained below. The identity of each constant being currently programmed and/or entered to memory is denoted by the position of a cursor, in the form of illumination of one of the segments of bar graph 60. An operators manual indicates which segment of bar graph corresponds to the programming of which constant or information into the system.

In the operate mode, the switch 52 is utilized to decrease the programmed application rate by some ]small increment for minor "on the go" types of adjustments. In the SETUP mode, switch 52 is used to select one of the digits 58 to be set to the desired value and entered (the digit selected will flash on and off). Each time switch 52 is touched the next digit 58 to the right will be selected and being to flash on and off.

Touch switch 54 causes an incremental, "on the go" increment to be added to the previously programmed selected application rate. (Switch 52, as mentioned, causes the same increment to be subtracted.) In the SETUP mode, the selected digit may be set to any value by touching the switch 54, or by holding pressure on the switch 54 to cause the digit to increment from zero to nine. When the digit has been set to the desired value, the switch 52 is utilized to select the next digit for setting.

Additionally, the switch 50, when touched in the operate mode causes an immediate return to the programmed application rate from any incremented "on the go" application rate previously effected by the use of switches 52 or 54.

In the SETUP mode, the operator may enter any number of constants, in the order as follows, in to the memory portion of the system, by utilizing the touch switches 52 and 54 as described above. The desired application rate is entered first, in pounds per acre. It should be understood that while the present description describes entry of constants in English units, that metric units may be utilized as well without departing from the invention, since the system is also programmed to recognize, accept and operate in terms of metric units of measurement. Next the operator enters the desired incremental amounts of change in the application rate which will be automatically effected in the "change on the go" procedure as described above.

The density in terms of weight per unit volume of the material to be distributed (at a given temperature and pressure) is next entered by the operator. A flow sensor constant is generally provided with th flow meter 22 utilized and is entered next. The next entry is the effective width of coverage of the applicator, spray bar or other distribution apparatus, that is the width over which material is spread during a single pass over a field or other area to be treated.

The next constant is referred to as a "system response" constant and determines the amount of driving power required by the control valve motor to make minor adjustments in operation to maintain the desired application rate. An operator's manual will specify the number to be entered for a given control valve 20. The next constant entered by the operator is a ground speed calibration number which may be specified by a manual for a given ground speed sensor or may be determined in a ground speed calibration procedure described hereinbelow.

Regarding the system response constant, when the control system is operating correctly, the console display will show some slight variations from time to time in the application rate, due to variations in velocity or ground speed of the apparatus. However, if the display fluctuates by relatively large amounts, this indicates that the system response constant should be decreased. On the other hand, if the display is slow in responding to a change in ground speed or application rate (such as a change on the go entry) or it consistently indicates a rate other than the desired and entered application rate, the system response constant should be increased in value.

The ground speed calibration is a number that essentially matches the ground speed sensor to the control system. To determine the constant for a given apparatus, the tractor or other mobile apparatus is driven over a measured course while the console monitors the signal produced by the particular ground speed sensor being used. In this way the console can determine the correct adjustment for accommodating this particular sensor. In operation, the "ground speed" calibration process is as follows. The system is placed in set-up mode and the switch 38 is moved to the FLUSH position and released as the tractor or other apparatus pulls even with the start of a 400 foot long measured and marked course preferably over level ground. The measured course is driven at as constant a speed as possible and the switch 38 is again pushed and released from its FLUSH position when the finish of the course is reached. Thereupon, the display 58 will indicate the necessary ground speed calibration number to be entered.

As indicated above, the position of the cursor along the display bar graph 60 indicates the constant being displayed in the SETUP mode and, as mentioned above, each touch of switch 50 moves to the next constant to be programmed and/or displayed in the following order:

| BAR CURSOR POSITION | CONSTANT |
|---|---|
| 10 | APPLICATION RATE |
| 20 | + and − APPLICATION RATE |
| 30 | DENSITY |
| 40 | FLOW SENSOR CONSTANT |
| 50 | WIDTH |
| 60 | SYSTEM RESPONSE |
| 70 | GROUND SPEED CALIBRATION |

In operation, the OFF/AUTO/FLUSH switch 38 should initially be set to the off position and the ON/OFF switch 36 on the ON position whereupon the alarm will be sounded and all of the display segments will be illuminated for one second. The programmed value for desired application rate will next be displayed for one second and the console will enter into the operate mode showing the current application rate, which prior to commencing operation will of course be zero (0). To begin operation, the OFF/AUTO/FLUSH switch is placed in the AUTO position and the application of material begins with normal operation of the sprayer or other apparatus. At this time the actual application rate being achieved will be displayed in the digits 58, and after some brief initial start-up period, this application rate will generally match the desired pre-programmed application rate within some small margin of variation. Each operation of the touch switches 52 or 54 will cause the application rate to be "changed on the go" and the pre-selected increment of increase or decrease should thereafter be reflected in the current application rate displayed.

The bar graph 60 located at the top of the display will indicate the percent of maximum flow being achieved. In the illustrated embodiment, the maximum flow is fixed at 4,000 pounds per hour. This bar graph provides a good indication of the system stability, and with normal system variations, the bar should flash one or two bars to each side of the average display position during application. If the bar graph appears unstable, it is an indication that the system response constant must be adjusted as described above. The APER (application rate error) message will be displayed in the event the control valve 20 reaches its maximum or full open position, this message will flash at one second intervals and will be accompanied by a short burst from the audible alarm. Similarly, the "checkmark" symbol may be used, with or without the audible alarm, to provide any further desired "alarm" function. For example a hopper or tank level may be mounted and the warning (checkmark lighted) given when it falls below a given level. This "checkmark" warning may also be used when the "nozzle monitor" function described above determines that one or more nozzles is worn or plugged.

Figure 8A:
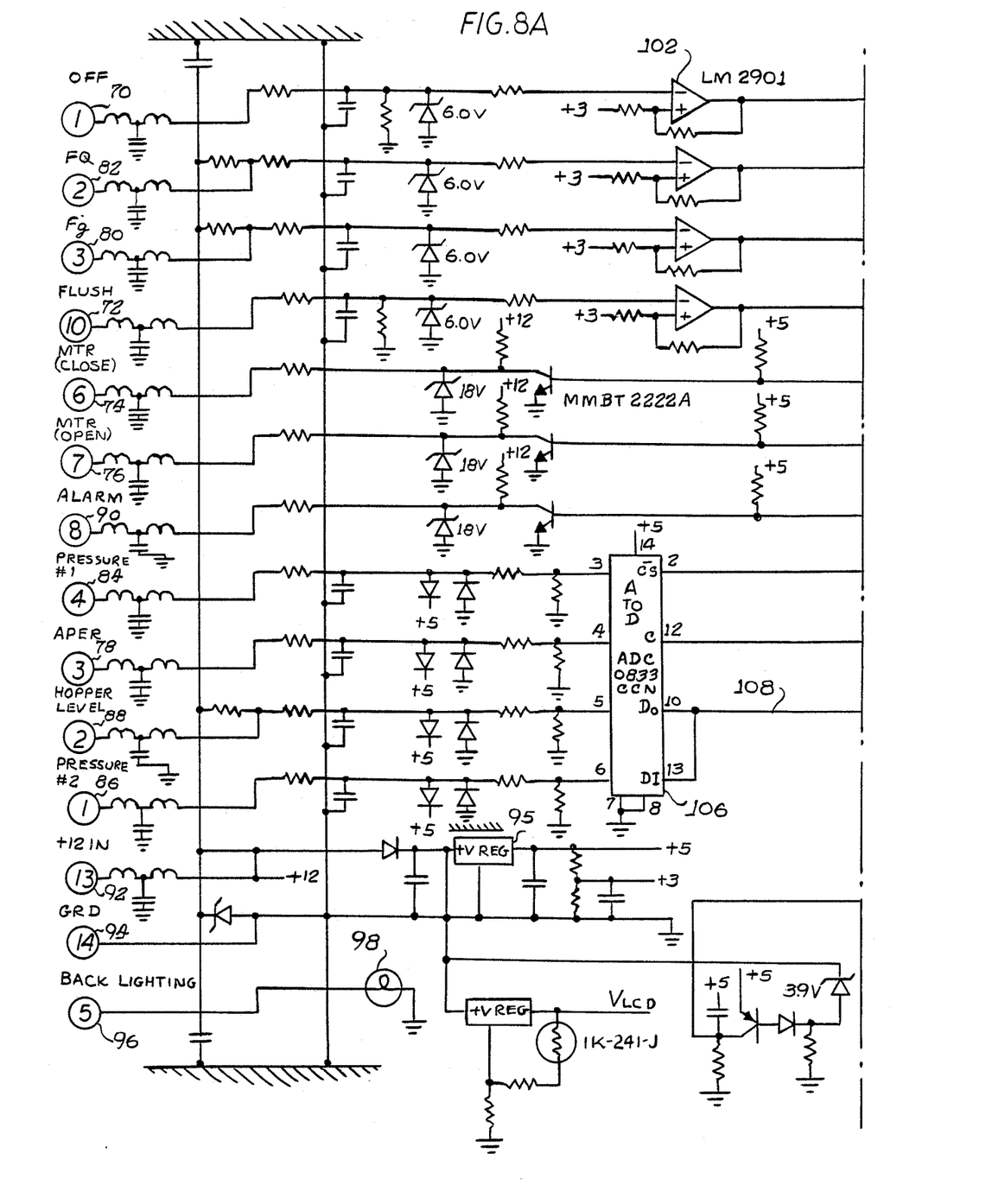
FIGS. 8A and 8B, taken together, form a schematic circuit diagram of a microprocessor-based monitoring and control circuit and associated display panel in accordance with a preferred form of the invention.
Figure 8B:
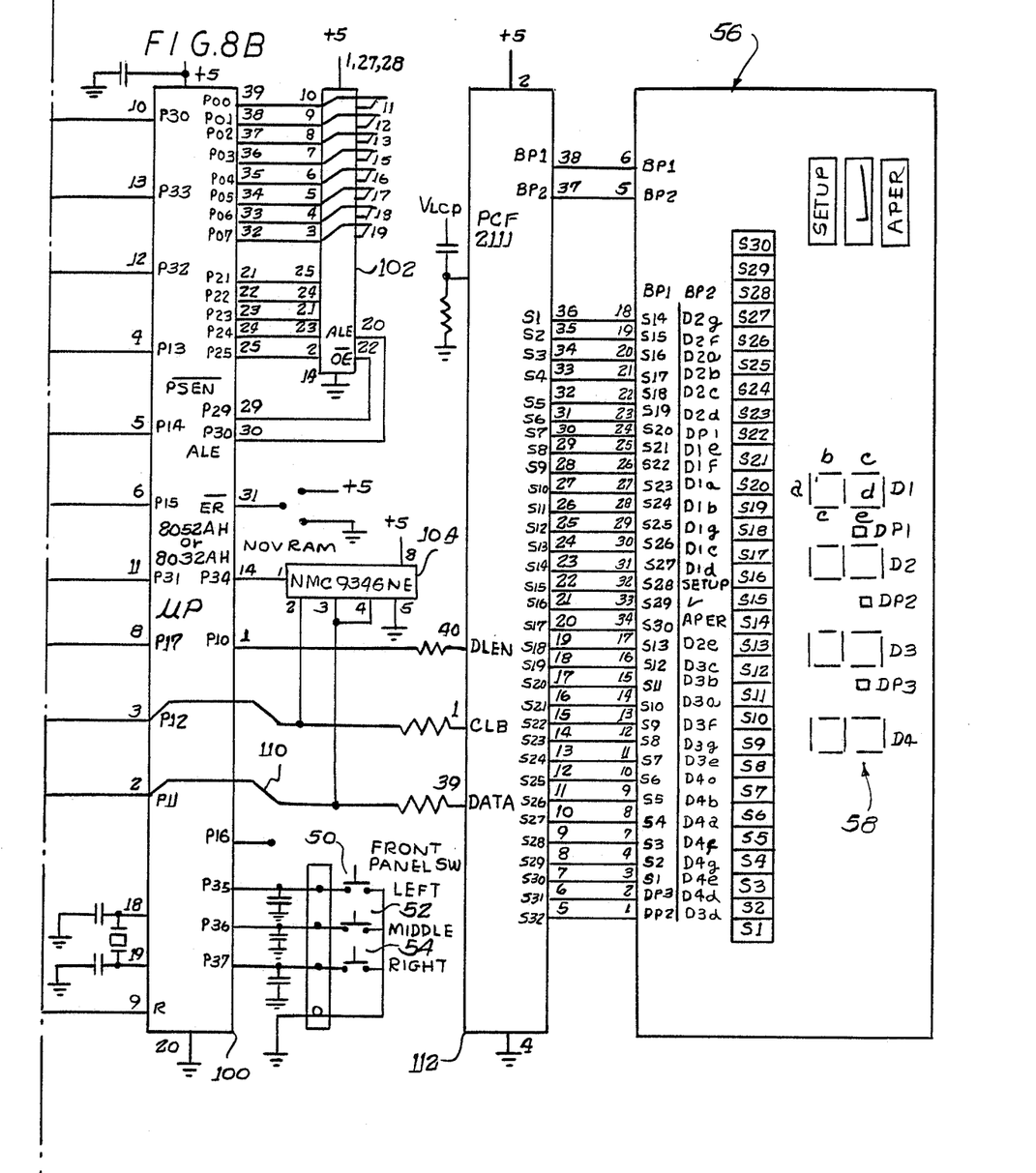

Referring briefly to FIGS. 8A and 8B, the circuit schematic diagram of the monitoring and control circuit of the invention is shown. Various inputs and outputs to the circuit are indicated at the left hand side of FIG. 8A. These include inputs 70 and 72 for the OFF and FLUSH signals from the OFF/AUTO/FLUSH switch 38. Motor control signals for closing and opening the valve are fed out on outputs 74 and 76 and the valve full open signal is monitored at an application error (APER) input 78. A signal frequency Fg from ground speed sensor 12 is received on input 80 while a single frequency FQ from a flow meter 22, if utilized, is received at input 82. When a pressure sensor 24 is utilized, its input signal is connected at both inputs 84, 86 which leave somewhat different scaling resistors. The process selects one of these two inputs based upon the voltage level present on inputs 84, 86. This device of scaling permits a somewhat greater range of voltage values to be accomodated with improved resolution. Other functions of the apparatus such as the level of material in a hopper or tank such as tank 14 may be monitored by a suitable sensor coupled to an input 88.

A signal to energize alarm 40 is produced at output 90. Additional inputs include a 12-volt battery or other vehicle electrical system input 92, a ground input 94 and a back lighting voltage input 96 for back lighting of the display, by means of the schematically illustrated lamp or other suitable lighting means 98. Inputs 70, 72, 80 and 82 are fed to suitable input ports of a microprocessor 100 by way of respective operational amplifiers 102, preferably of the type LM 2901.

The microprocessor 100 preferably comprises a microprocessor component of the type generally designated 8052AH or 8032AH of the 8052 family of microprocessors available, for example, from the Intel Company. The 8052 contains on-board memory, while selection of the 8032 processor requires the addition of a further outboard memory component 102. Additional non-volatile memory for accommodating certain data and information as described above is provided in the form of a NOVRAM 104, which in the illustrated embodiment is a unit of the type generally designated NMC 9346NE. The front panel switches 50, 52 and 54 also couple with the microprocessor as illustrated in FIG. 8B.

Referring again to FIG. 8A, the inputs 78, 84, 86 and 88 are coupled to the microprocessor 100 by way of an A to D converter/selector component 106, preferably of the type generally designated ADC 0833CCN. The A to D converter 106 responds to a serial data input at a DI input port (pin 13) from the microprocessor 100 for selecting one of the inputs 78, 84, 86 and 88, converting the data on the input to serial, digital form and feeding it back out on serial data output port (DO-pin 10) to the microprocessor 100. In this regard, a single serial line 108 is utilized for both data input and output between the A to D converter 106 and microprocessor 100.

Figure 7:
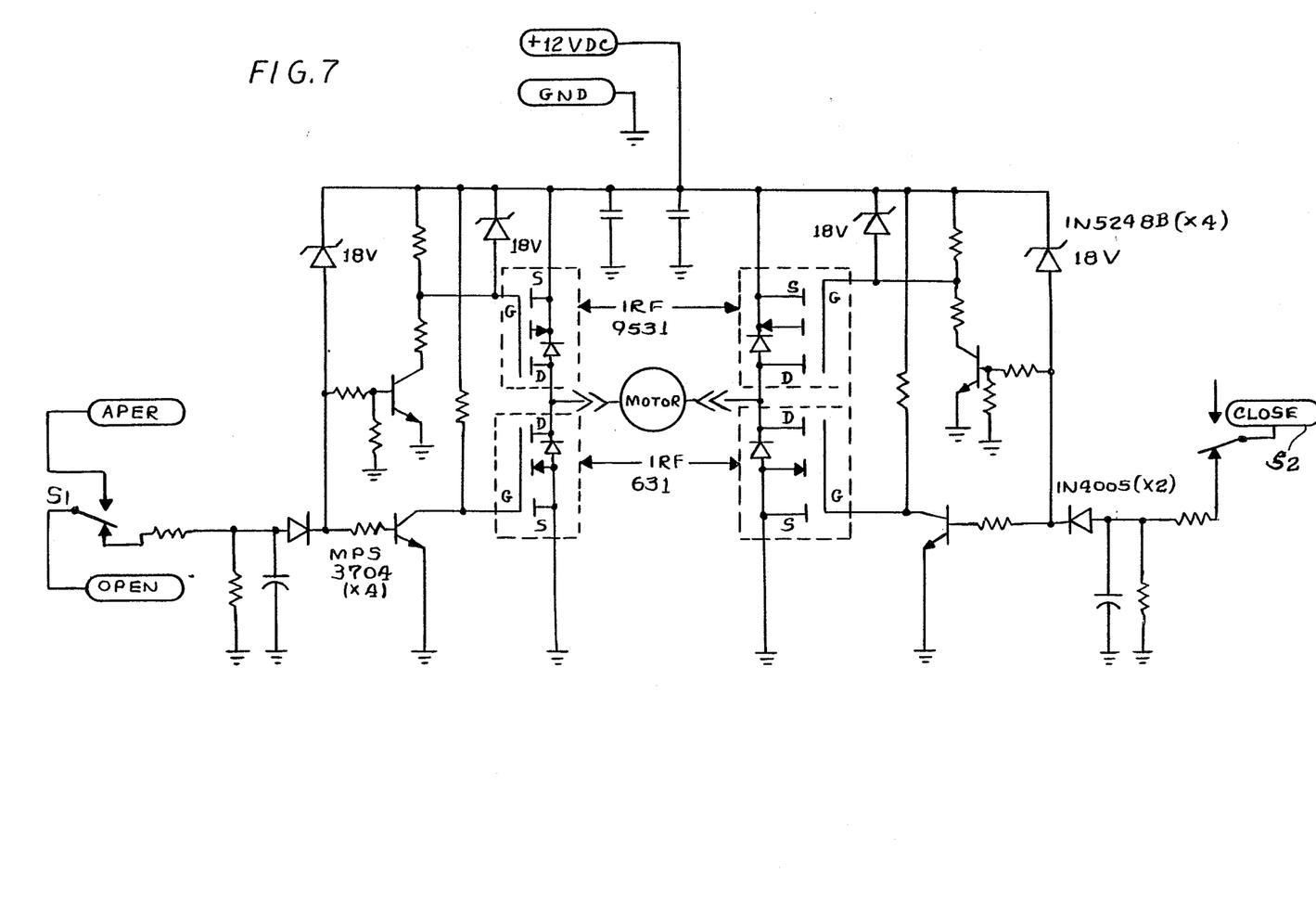
FIG. 7 is a circuit schematic of motor control circuit in accordance with a preferred form of the invention.

Referring to FIG. 8B, serial data for operation of the display panel 56 is fed out of the microprocessor on a line 110 to a DATA input of a display driver component 112, which in the illustrated embodiment preferably comprises a component of the type PCF 2111. Interconnections between the display driver 112 and display panel 56 are illustrated. The positive 12 volt input and ground connections feed respective voltage regulators 95, 97 for providing a suitable regulated positive DC voltages for operation of the circuit and display. For purposes of illustrating a preferred embodiment of the invention, a motor control circuit with OPEN and CLOSE inputs and an application error (APER) output, which are coupled with the like designated inputs and outputs of the processor circuit of FIG. 8, is illustrated in FIG. 7: Additional limit switches S1 and S2 operate when the valve 20 reaches its fully open and fully closed positions. Hence the "APER" line connects to the "fully open" limit switch S1.

Figures 9, 10:
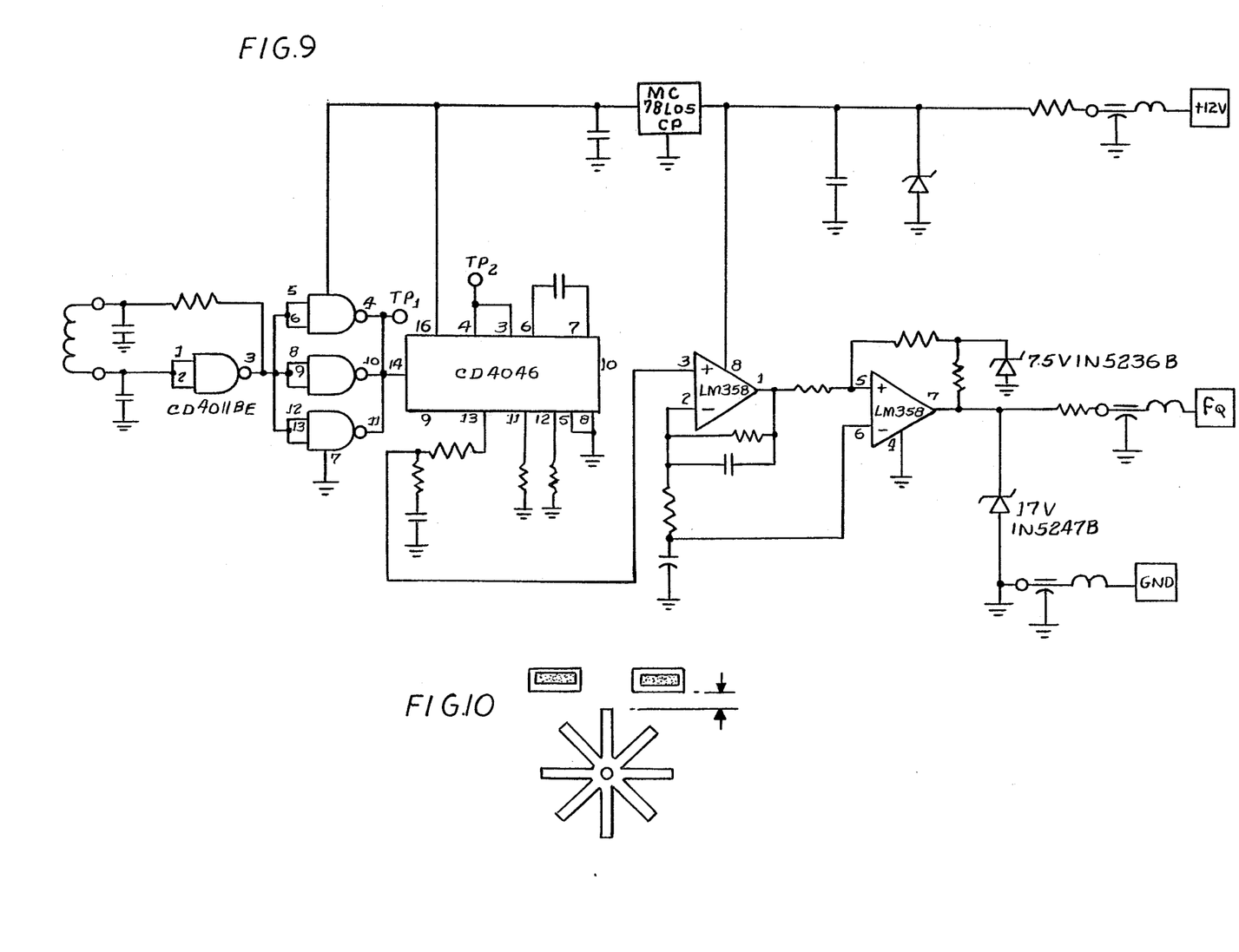
FIG. 9 is a circuit schematic of a flow meter circuit in accordance with a preferred form of the invention.

Additionally, while any of a variety of meter arrangements may be utilized without departing from the invention, we prefer to utilize a flow meter circuit of the type illustrated in FIG. 9, which provides a flow signal frequency FQ at its output, as indicated, to the like-designated input of the processor circuit of FIG. 8. This circuit generally measures the pulses produced as a "paddle wheel" interposed in the flow path rotates relative to an electromagnetic coil type of sensor placed at an appropriate position on the exterior of the tube or conduit adjacent the location of the paddle wheel.

Figure 5:
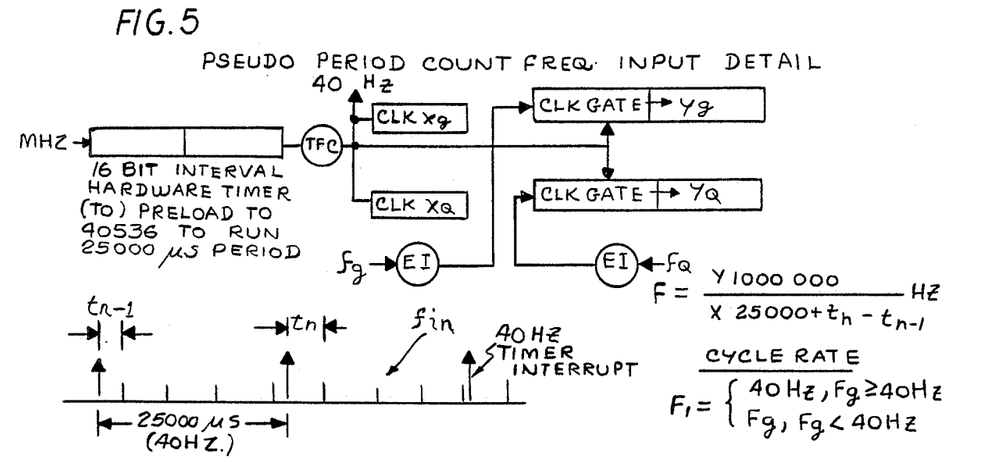
Figure 6:
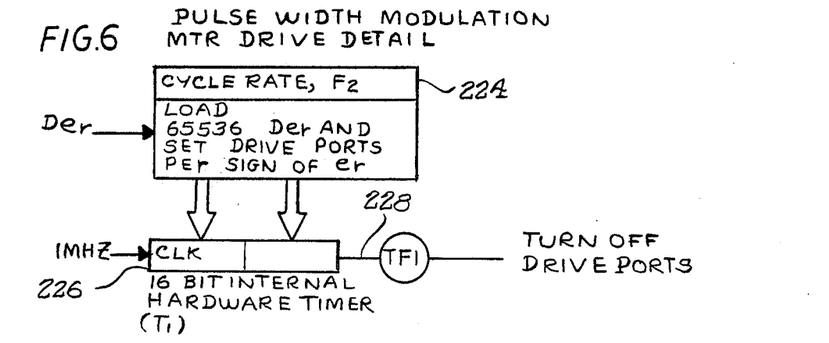

Referring now briefly to FIGS. 4 through 6, operation of the circuit of FIG. 8 is shown in functional block form. Referring initially to FIG. 4, the respective frequency signals from the ground speed sensor 12 and flow meter 22 are designated as fg and fQ, respectively. The signal from pressure transducer 24 is a signal voltage designated as "Vi". Both of the signal frequencies fg (same as Fg above) and fQ (same as FQ above) are processed in the same manner, being fed initially to respective period counter functional blocks 200, 202 with the resultant period-related signals f'g and f'Q being fed to respective digital filter blocks 204, 206. The operation of the digital filter block is the same as that illustrated and described in U.S. Pat. No. 4,633,252. The respective period counters operate at a 40 hertz cycle rate, that is in 25,000 microsecond (25 millisecond) intervals, to count the number of frequency pulses or "interrupts" in each 25 millisecond interval. In the event the incoming frequency is less than 40 hertz, the period counter operates to count the number of 25 millisecond "interrupts" or cycles during each cycle of the incoming frequency. These two inversely related count functions are indicated as Xg and Yg in the illustrated period counter blocks.

The resultant signal f''g from the digital filter 204 represents a ground speed signal which is fed to one of two branches for further processing. The first branch squares the signal in the event a pressure sensor is used as the feedback signal and the second branch feeds the ground speed signal directly through in the event a flow meter utilized for the feedback signal. A reference ground speed is also indicated at this branching point, which comprises the maximum ground speed, corresponding to full opening of the control valve 20 in response to the "flush" command. This "flush" reference is substituted at this point for f''g when the switch 36 is actuated to the FLUSH position. This would represent maximum ground speed at which the system is capable of operation, that is with the valve 20 full open.

The pressure signal Vi, depending on the pressure sensor selected, flows through one of two similar functional branches or channels having appropriate selected gains and a corresponding one of two 8-bit A to D conversion functional channels. These "channels" correspond to the two pressure inputs 84, 86 as described above. The resultant digital signal or "counts" are further processed at functional block 216 which performs the indicated mathematical operation on the counts for each of the two channels. Essentially, the Kv constant defines a "pressure transducer" which produces a pressure signal having a slope and offset of the form $Y=MX+B$. The resultant pressure value Y, is here designated as Pc. The digital "counts" represent the X term, and the constants Kv represent the slope term. The constant VPo represents the voltage offset of the "pressure transducer". The Kv constant is the number of counts per volt produced by the selected "pressure transducer" and forms the A to D conversion constant of the channel, the Kv 1 constant being for channel number 1 and the Kv 2 constant for channel number 2, The selected ground speed signal f''g or $(f''g)^2$ is fed to an error junction 218 with the corresponding selected one of the resultant flow signal f'Q or the resultant pressure signal Pc. The constant Km is a scale multiplier or forward gain constant of the system. The constant K is the match constant, that is, a constant multiplier for taking into account the effective spray width or spread width of the apparatus, the selected distribution rate of material, the density of the material, and other such constants. When the "nozzle monitor" function described above is incorporated, both the Pc and f'Q signals are used. However, the f'Q signal is compared with f''g only for "alarm" purposes in this situation, with the Pc signal along being used at the error junction 218 to develop the control signal.

The resultant signal value from the error junction 218 is utilized to drive the motor by way of a phase lead functional block 220 and a scale multiplier functional block 222, each of which perform the functions generally as indicated schematically therein. The resultant drive error signal is designated by the symbol Der. The sign of the error signal determines which way the motor is to be rotated (i.e., to open or close the valve 20), and hence which side of the motor drive circuit of FIG. 7 the "open" valve side or the "close" valve side is to be driven by the error signal Der.

This drive error signal Der is further processed into a duty cycle controlled signal as indicated functionally in FIG. 6. Briefly, the Der signal is loaded in accordance with the block 224 into the bits of a 16-bit timer functional block 226 in which the carry over count 228 forms the turnoff signal for the drive ports, the counter being driven at a one megahertz clock rate. The loading of the 16-bit timer or counter block is at the cycle rate of 40 hertz mentioned above, such that the clock counts up to its full count of 65536, starting from the digital Der number loaded in. Hence, the drive ports, which are turned on at each timer interrupt cycle at 40 hertz intervals, will be turned off when the timer counts to 65536, which will thereby develop a variable duty cycle type of drive signal to the motor. It will be noted that with the 40 hertz cycle rate the maximum count which may be counted by the clock is 25,000 counts. This corresponds to the 25,000 microseconds available to the one megahertz clock signal at a 40 hertz interrupt rate. Accordingly with the value of Der at a digital 25,000 or more, the drive will remain at a full or 100% duty cycle. With the value of the error drive signal between zero and 25,000, the motor drive will be a variable duty cycle. With an error signal value of zero the motor drive will be always off or a 0% duty cycle.

Referring briefly to FIG. 5 the operation of the period counter, functional blocks 200 and 202, as described above, is illustrated in somewhat further detail in functional block form.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A monitoring and control system for a mobile material distribution apparatus wherein the rate of material distribution per unit area varies as a predetermined function of the ground speed of the mobile apparatus and of the rate of operation of variable rate delivery means for delivering material at a controllable rate to material distribution means for distributing the material along the path of travel of the mobile apparatus; said system comprising: ground speed sensor means for developing a ground speed signal corresponding to the ground speed of the mobile apparatus and delivery rate sensor means for developing a delivery rate signal corresponding to a rate of delivery of material by said variable rate delivery means; monitoring and control circuit means responsive to said ground speed signal and to said delivery rate signal for developing a control signal for controlling the operation of said variable rate delivery means to achieve and maintain a desired rate of distribution of material along the path of travel of the mobile distribution apparatus, said monitoring and control circuit means further comprising processing means responsive to said ground speed and delivery rate signals for producing said control signals and for further producing display signals corresponding to associated functions and conditions of the mobile apparatus, and memory means for storing data and instructions for enabling said processing means to respond to delivery rate signals from each of a plurality of different types of delivery rate sensor means, means for identifying a particular type of delivery rate sensor means coupled with said control and monitoring circuit means; and said processing means being responsive to said sensor identifying means for selecting from said memory means data and instructions for enabling response to the delivery rate sensor means identified thereby.

2. A system according to claim 1 wherein said memory means comprises first, mask-programmable, non-alterable memory means for containing non-changeably constants, including unit conversion constants, second non-volatile memory means accessible only to authorized factory or service programming personnel for containing changeable conversion constants including said data and instructions for enabling response to said plurality of delivery rate sensor means, and third, user-accessible non-volatile memory means for receiving and storing data relating to the particular characteristics of the selected delivery rate sensor means.

3. A system according to claim 2 wherein said user accessible non-volatile memory means is further adapted to receive and store user-selected data corresponding to selection of English or metric units for display, to calibration of said processor for operation with the particular ground speed sensor associated with the mobile distribution apparatus and to data relating to the particular distributing means associated with the mobile material distribution apparatus.

4. A system according to claim 1 wherein said memory means further stores data and instructions for enabling said processing means to respond to the sensor signals from any of a plurality of ground speed sensors selectable for use with the material distribution apparatus with which said monitoring and control system is tou be utilized.

5. A system according to claim 1 and further including operator accessible console means including observable display means for displaying functions and conditions monitored by said monitoring and control circuit in accordance with the display signals produced thereby, and for selecting particular ones of said functions and conditions for display as desired.

6. A system according to claim 2 and further including operator accessible control means for entering the desired data to said user-accessible non-volatile memory means.

7. a system according to claim 1 wherein said monitoring and control circuit means includes microprocessor means having a plurality of inputs coupled respectively to said sensor means and to user-accessible control means, first output means for delivering said display signals to user-observable display means and second output means for delivering said control signals to said variable rate material delivery means.

8. A system according to claim 7 wherein said plurality of inputs includes at least one additional input for connection to additional sensor means for monitoring a further condition or function of the mobile material distribution apparatus, and wherein said processing means includes means responsive to said further sensor means for producing corresponding display signals.

9. A system according to claim 1 wherein said mobile material distribution apparatus comprises a liquid sprayer apparatus, wherein the material distribution means comprises a plurality of nozzles and wherein said delivery rate sensor means comprises a pressure sensor operatively coupled for sensing the pressure across the nozzles.

10. A system according to claim 9 and further including flow rate sensor means for producing a flow rate signal corresponding the rate of flow of liquid to said nozzles; and wherein said monitoring and control circuit means further includes means for comparing said flow rate signal with one of said ground speed signal and said pressure signal and for producing display signals corresponding to one or more of said nozzles being in an operative or inoperative condition based upon said comparison.

11. A monitoring and control system for a mobile liquid sprayer apparatus of the type including a plurality of nozzles, and wherein the rate of liquid distribution per unit area of the mobile sprayer apparatus varies as a function of the ground speed of the apparatus and of the pressure across the nozzles; said monitoring and control system comprising; ground speed sensor means for developing a ground speed signal corresponding to the ground speed of the mobile apparatus and pressure sensor means for developing a pressure signal corresponding to the pressure across the nozzles; monitoring and control circuit means responsive to said ground speed signal and to said pressure signal for developing a control signal for controlling the rate of flow of liquid to the nozzles for achieving and maintaining a desired rate of distribution of liquid along the path of travel of the mobile sprayer apparatus; said monitoring and control circuit means further comprising processing means responsive to said ground speed and pressure signals for producing said control signals and for further producing display signals corresponding to associated functions and conditions of the mobile apparatus; and further including flow rate sensor means operatively coupled with said apparatus for producing a flow rate signal corresponding to the rate of flow of liquid to the nozzles, and wherein said monitoring and control circuit means is further responsive to said flow rate signal for determining whether one or more said nozzles is in an inoperative condition, and for producing display signals corresponding to one or more of said nozzles being in an inoperative condition.

12. A system according to claim 11 wherein said processing means further includes means for comparing the ratio of said ground speed signal to said flow rate signal and determining whether one or more of said nozzles is in an inoperative condition based upon said comparison.

13. A monitoring and control system for a mobile material distribution apparatus wherein the rate of material distribution per unit of area varies as a predetermined function of the ground speed of the mobile apparatus and of the rate of operation of variable rate delivery means for delivering material at a controllable rate to material distribution means for distributing the material along the path of travel of the mobile apparatus; said monitoring and control system comprising: ground speed sensor means for developing a ground speed signal corresponding to the ground speed of the mobile apparatus and delivery rate sensor means for developing a delivery rate signal corresponding to a rate of delivery of material by said variable rate delivery means; said monitoring and control system including monitoring and control circuit means responsive to said ground speed signal and to said delivery rate signal for developing a control signal for controlling the operation of said variable rate delivery means to achieve and maintain a desired rate of distribution of material along the path of travel of the mobile distribution apparatus, said monitoring and control circuit means further comprising processing means responsive to said ground speed and delivery rate signals for producing said control signals and memory means for storing data and instructions for enabling said processing means to respond to delivery rate signals from each of a plurality of different types of delivery rate sensor means.

14. A system according to claim 13 wherein said delivery rate sensor means comprises a pressure sensor.

15. A control system according to claim 13 wherein said delivery rate sensor means comprises a flow rate sensor for measuring the flow of material to said distribution means.

* * * * *